United States Patent [19]

Aoshima

[11] Patent Number: 5,155,848

[45] Date of Patent: Oct. 13, 1992

[54] METHOD OF SEARCHING AND DISPLAYING SELECTED DATA AND FOR UPDATING DISPLAYED DATA IN A TEXT EDITING SYSTEM

[75] Inventor: Kenichi Aoshima, Yokohama, Japan

[73] Assignee: Hitachi, Ltd., Tokyo, Japan

[21] Appl. No.: 195,499

[22] Filed: May 18, 1988

[30] Foreign Application Priority Data

May 20, 1987 [JP] Japan .................... 62-123020

[51] Int. Cl.⁵ .................................... G06F 15/40
[52] U.S. Cl. ................................ 395/600; 364/253.1;
 364/282.2; 364/927.2; 364/943; 364/DIG. 2;
 395/100
[58] Field of Search ... 364/200 MS File, 900 MS File;
 395/600, 100

[56] References Cited

U.S. PATENT DOCUMENTS

| | | | |
|---|---|---|---|
| 4,477,880 | 10/1984 | Advani et al. | 364/900 |
| 4,498,142 | 2/1985 | Advani | 364/900 |
| 4,498,147 | 2/1985 | Agnew et al. | 364/900 |
| 4,509,122 | 4/1985 | Agnew et al. | 364/200 |
| 4,555,773 | 11/1985 | Karnes, Jr. | 364/900 |
| 4,556,954 | 12/1985 | Advani et al. | 364/900 |
| 4,661,811 | 4/1987 | Gray | 340/724 |
| 4,674,040 | 6/1987 | Barker | 340/734 |
| 4,683,468 | 7/1987 | Himelstein | 340/710 |
| 4,684,990 | 8/1987 | Oxley | 340/729 |
| 4,686,522 | 8/1987 | Hernandez | 340/723 |
| 4,689,616 | 8/1987 | Goude | 340/729 |
| 4,811,205 | 3/1989 | Normington | 364/900 |
| 4,811,244 | 3/1989 | Shimada | 364/521 |
| 4,849,745 | 7/1989 | Satou | 340/721 |

OTHER PUBLICATIONS

"Information Processing" vol. 25, No. 8, 1984, pp. 759-766.

Primary Examiner—David Y. Eng
Assistant Examiner—Eric Coleman
Attorney, Agent, or Firm—Antonelli, Terry, Stout & Kraus

[57] ABSTRACT

In an interactive text editing system, a condition for specified data is set in response to a command for instructing display of only the specified data, only data and read out of a first storage device commensurate with the condition is stored in a second storage device and the data in the second storage is displayed on a display unit. Upon storing the data in the second storage device, position information indicative of a position taken by the corresponding data within the first storage device is concurrently stored in the second storage device. When updating the data in the second storage device, the corresponding data in the first storage device is concurrently updated on the basis of the position information for the updating data.

14 Claims, 5 Drawing Sheets

METHOD OF SEARCHING AND DISPLAYING SELECTED DATA AND FOR UPDATING DISPLAYED DATA IN A TEXT EDITING SYSTEM

BACKGROUND OF THE INVENTION

This invention relates to a data editing method and system for use in an information processing system using a computer and a display unit, and more particularly to a data editing method and system which allows the operator to edit data displayed on the screen of the display unit while watching the display screen.

A text editing system is explained in, for example, "Information Processing" Vol. 25, No. 8 (1984), pp 759-766, published in Japan.

In editing data, it sometimes occurs that among data representative of characters, symbols, patterns and the like stored in a file unit such as a disc storage, only specified data should be updated. For example, when the data stored in the file unit is representative of a sentence in the form of a character string, a specified word (sentence) in the sentence is sometimes desired to be replaced with another word (sentence). In another instance, only replaced (updated) words (sentence) before then are desired to be updated irrespective of the specified word.

In the conventional text editing system, the update processing is carried out by reading data, within a range which can be displayed over the screen of the display unit, out of the file unit, displaying the read data on the screen, finding specified data out of the displayed data through visual inspection conducted by the operator and renewing the specified data. Accordingly, in order to complete the updating of specified data selected from the data stored in the file unit, it is necessary for the operator to conduct a sequential display of all of the stored data by using a screen scrolling function, find the specified data through visual inspection and conduct the update processing. However, this processing is extremely time-consuming and very likely to cause an erroneous updating or an oversight of updating.

SUMMARY OF THE INVENTION

The present invention intends to solve the above problems encountered in the conventional text editing system and has for its object to provide a text editing method and system by which only specified data commensurate with a specified condition can be read out of the file unit and displayed on the display unit to update the specified data within a short period of time with ease and without fail.

A feature of text editing according to the invention resides in that a condition for specified data is set in response to a command for instructing display of only the specified data, data is read out of a first storage and among the read data, only data commensurate with the condition is stored in a second storage, and the data in the second storage is displayed on the display unit. Another feature of text editing according to the invention resides in that, upon storing the data commensurate with the condition into the second storage, position information indicative a position taken by that data within the first storage is concurrently stored and upon renewal of the data in the second storage, the data stored in the first storage and corresponding to the updated data is concurrently updated on the basis of the position information.

Still another feature of text editing according to the invention resides in that a plurality of conditions are set for the specified data and among data read out of the first storage, data commensurate with a condition of the logical OR of the plurality of conditions is stored in the second storage. According to still another feature of the invention, a plurality of conditions are set for the specified data and among data read out of the first storage, data commensurate with a condition of the logical AND of the plurality of conditions is stored in the second storage. According to still another feature of the invention, a plurality of conditions are set for the specified data and among data read out of the first storage, data commensurate with a combinational condition of the logical OR and logical AND of the plurality of conditions is stored in the second storage.

In accordance with the above features of the invention, only data commensurate with specified conditions can simultaneously be displayed on the screen of the display unit to permit updating of the specified data within a short period of time without causing an oversight of updating and besides the data stored in the first storage can be updated concurrently with the updating of the specified data. In this manner, the time for edit processing can be saved.

DESCRIPTION OF THE PREFERRED EMBODIMENTS

The invention will now be described by way of example with reference to the accompanying drawings.

Figure 1:
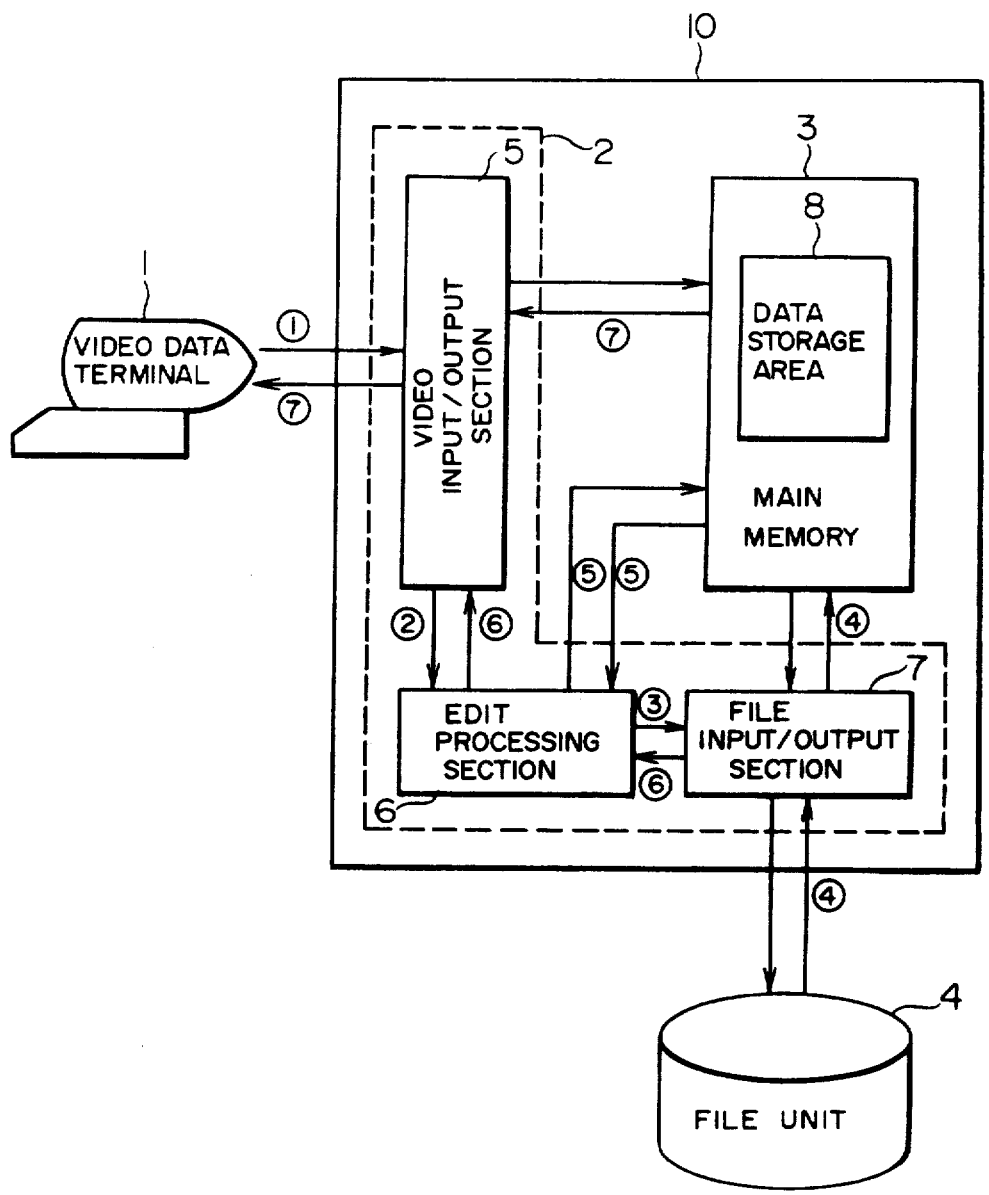
FIG. 1 is a block diagram illustrating the overall construction of a text editing system according to an embodiment of the invention.

FIG. 1 illustrates the overall construction of a text editing system according to an embodiment of the invention. Referring to FIG. 1, a video data terminal 1 is manipulated by the operator who is conversing with a data processor 10 to conduct various data processings in direct interactive fashion. The video data terminal 1 includes a display unit such as a CRT display and an input unit such as a keyboard. The data processor 10 comprises a text editing unit 2 and a main memory 3. As the data processor 10, a known microprocessor may be used. In that case, the text editing unit 2 corresponds to a central processing unit of the microprocessor and the main memory 3 corresponds to an internal memory having a storage area (not shown) for storing programs used to control the microprocessor and a data storage area 8 for storing data to be processed. A file unit 4 is an external storage such as a magnetic disc unit adapted to store original data. The text editing unit 2 includes a video input/output section 5, an edit processing section 6 and a file input/output section 7. The video input/output section 5 delivers data to be edited to the display unit of the video data terminal 1 and receives data and various commands inputted by the operator through the video data terminal 1. The edit processing section 6 is responsive to commands to perform edit processings of data from the data storage area 8. The file input/output section 7 is responsive to an edit command to supply data to be edited from the file unit 4 to the data storage area 8 and to restore edited data to the file unit 4.

Figure 2:
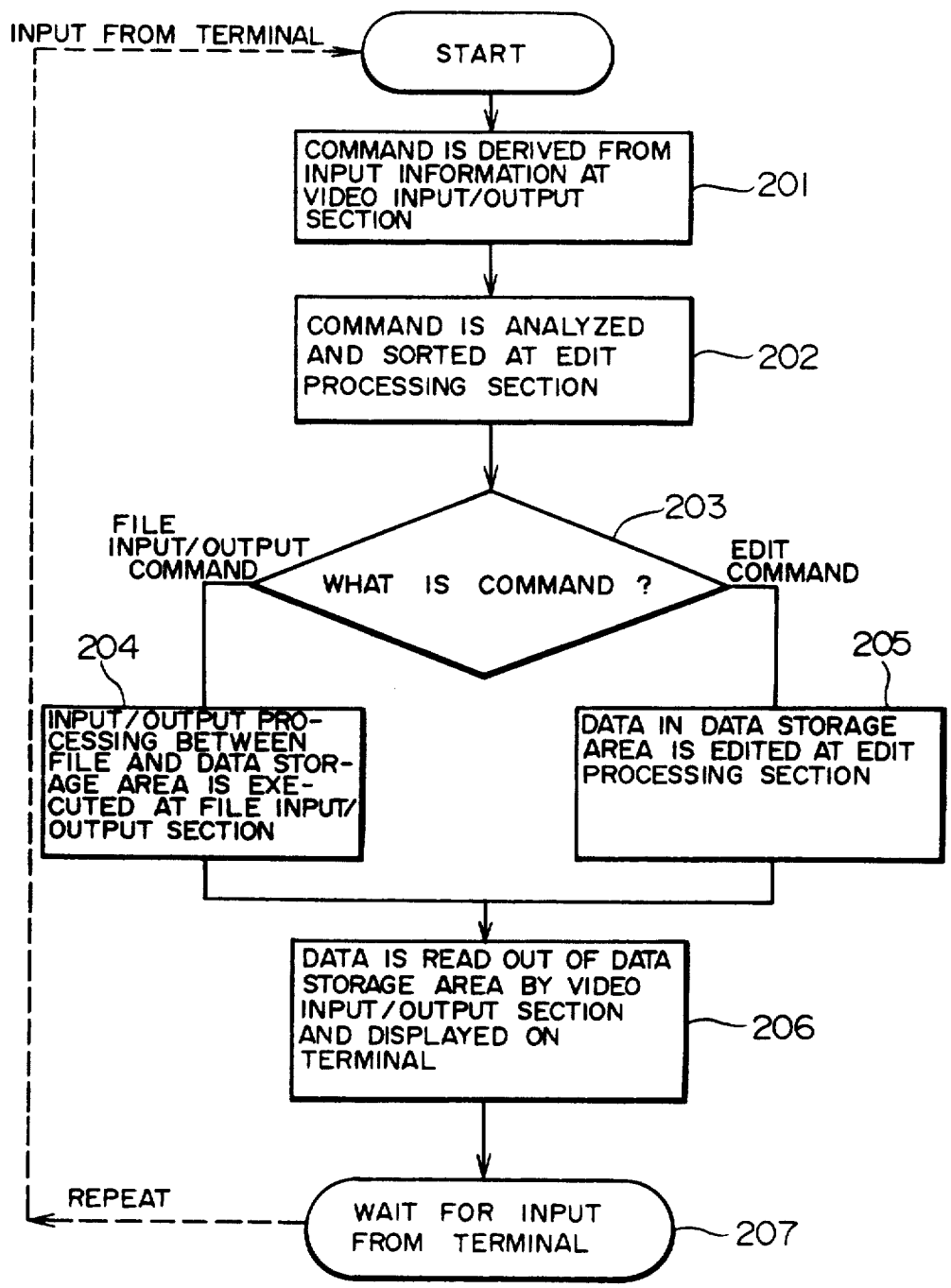
FIG. 2 is a flow chart useful in explaining the operation of the FIG. 1 system.

The data processing steps in the text editing system shown in FIG. 1 will now be described with reference to a flow chart as shown in FIG. 2. Numerical references ① to ⑦ in FIG. 1 indicate the order of processings and the flow of data/commands.

In step 201, an edit instructing command and data are inputted as indicated at ① from the video data terminal 1 to the video input/output section 5, the video input/output section 5 sorts the received data and command, and the data and command are converted into data formats easy to be processed in the edit processing section 6. In step 202, the edit processing section 6 analyzes the kind of the received command. In step 203, it is decided whether the received command is a file input/output command or an edit processing command. If the received command is the file input/output command, the file input/output section 7 reads data out of the file unit 4 and delivers the read data to the data storage area 8 of the main memory 3, in step 204. If the received command is determined to be the edit processing command in step 203, an edit processing is executed in connection with data designated by the command, in step 205. In step 206, the video input/output section 5 reads the data out of the data storage area 8 and delivers to the video data terminal 1 data to be displayed. After completion of the above processings, the video input/output section 5 waits for new input data and a command from the video data terminal 1.

Figure 3:
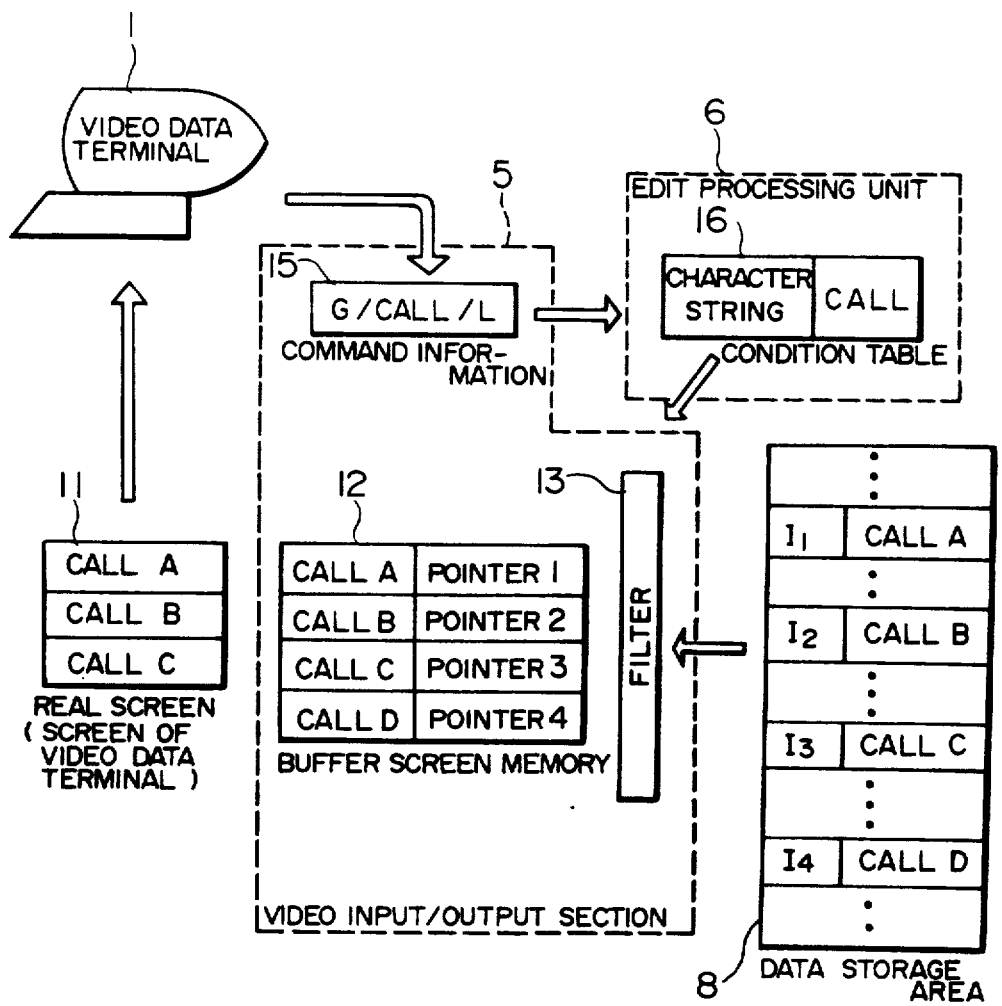
FIG. 3 is a diagram showing details of the FIG. 1 system.
Figure 4:
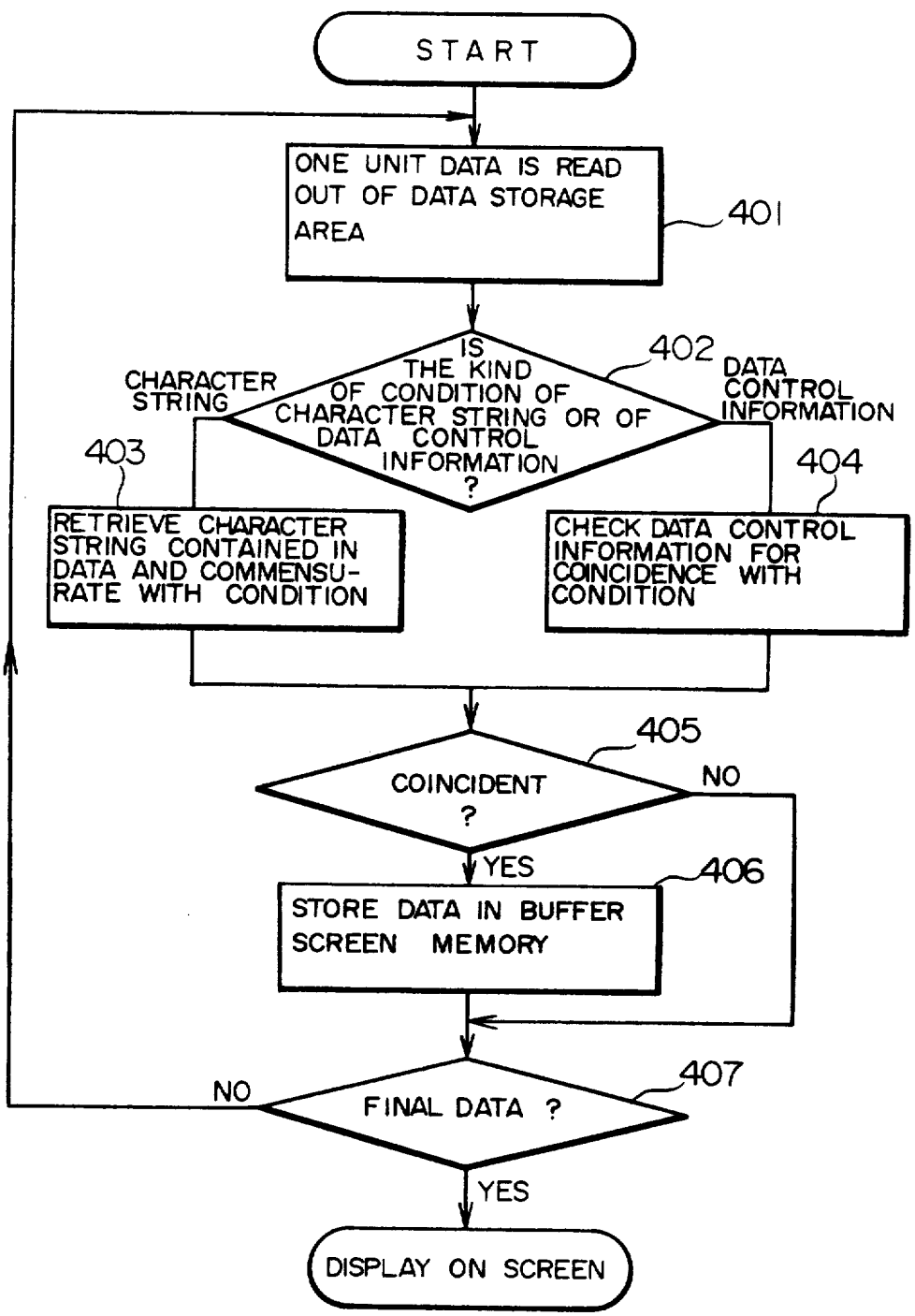
FIG. 4 is a flow chart of a processing for displaying only specified data.
Figure 5:
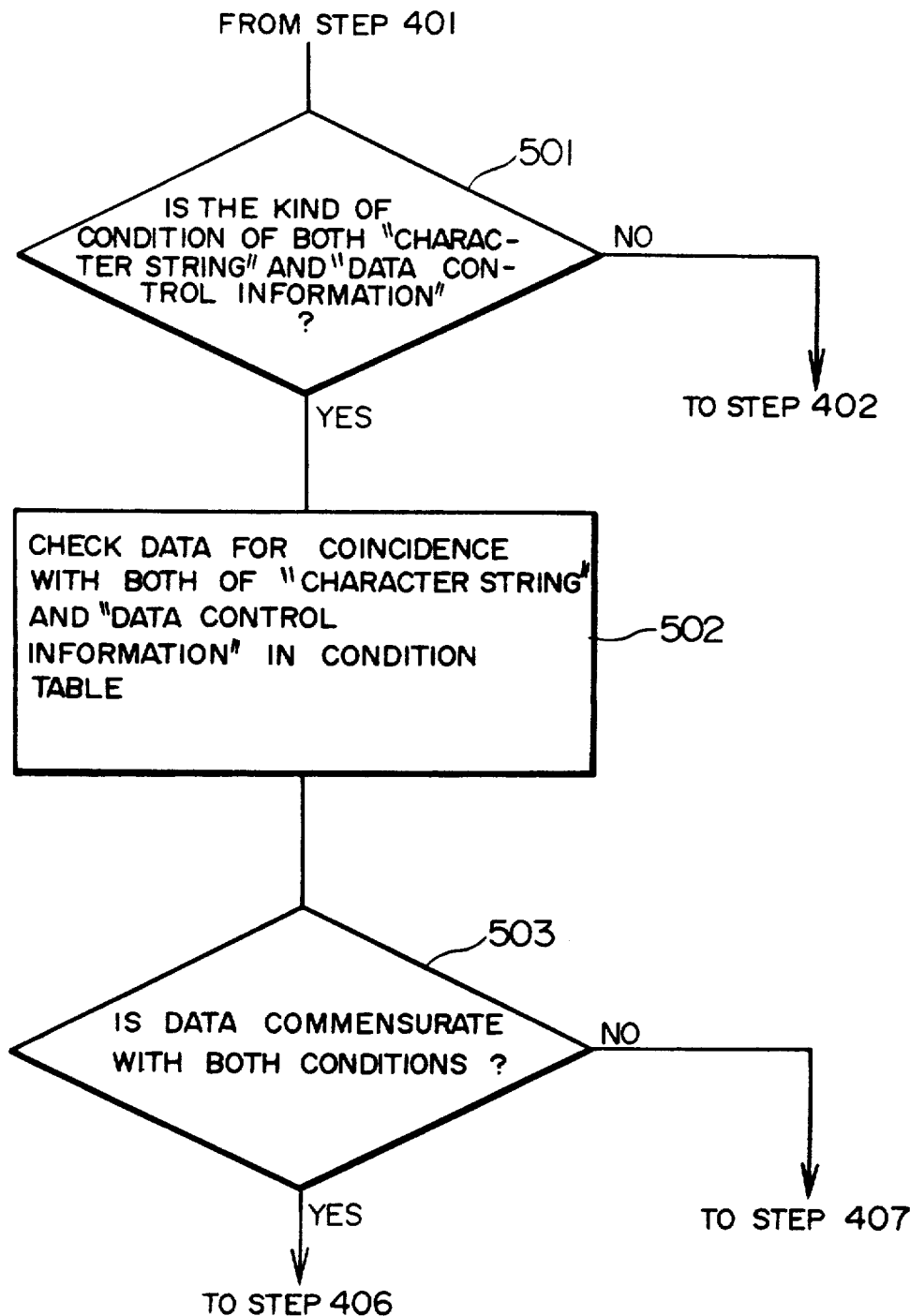
FIG. 5 is another example of a flow chart of a processing for displaying only specified data.

Referring now to FIGS. 3 to 5, a system for displaying only specified data on the display unit will be described.

Details of the video input/output section 5, edit processing section 6 and data storage area 8 are illustrated in FIG. 3. The video input/output section 5 includes a buffer screen memory 12 and a filter 13. The video input/output section 5 analyzes the data and command received from the video data terminal 1 and delivers only command information to the edit processing section 6. When the command is a command 15 for instructing display of only specified data, the edit processing section 6 prepares a condition table 16 on the basis of the contents contained in the command 15. The condition table 16 is set in the filter 13. The video input/output section 5 reads out data from the data storage area 8 and then fetches specific data to be displayed through the filter 13. The filter 13 selects from the read data only a set of data which is commensurate with the condition table 16 and delivers the selected data set to the buffer screen memory 12. The buffer screen memory 12 stores the set of data selected by the filter 13 commensurate with the condition table and concurrently stores position information or pointer information indicative of positions taken by the selected data set within the data storage area 8. The pointer information corresponds to top addresses of the set of data within the data storage area 8. By designating the pointer information, the data set within the data storage area 8 can be designated. The data set stored in the buffer screen memory 12 is displayed on the screen 11 of the display unit of the video data terminal 1. In this manner, only the data set commensurate with a specified condition can be displayed on the screen.

In the example shown in FIG. 3, the command 15 is described as "G/CALL/L". In this description, "G" defines "global" having the meaning that data over the entirety of the data storage area 8 should be processed, and "CALL" defines the contents of data to indicate a specified word "CALL". This word defines the contents of the specified condition. Accordingly, this exemplary command represents that the operator intends to see data containing the word "CALL" on the screen. The designation "L" indicates a processing for display on the screen. The edit processing section 6 responds to this command to prepare the condition table 16. In the condition table 16, "character string" indicates that the contents of the condition are a character string and "CALL" indicates the contents of the character string. Accordingly, the condition table 16 indicates data in which the specified condition for displaying data contains the character string "CALL". Data is stored in the data storage area 8 at addresses allotted to respective unit data as illustrated in FIG. 3. The unit data may be in a unit of a character string of one line displayed on the screen or alternatively may be in a unit of a character string which does not fill up one line. Given that the unit data is of a character string of one line on the display screen, the example of FIG. 3 indicates that the data storage area 8 contains four line data "CALL A", "CALL B", "CALL C" and "CALL D" each having the word "CALL", where "A", "B", "C" and "D" define character strings other than "CALL". The video input/output section 5 collates all of the unit data with the condition table 16 so that only a set of unit data commensurate with the condition table 16 which are representative of line character strings each containing the word "CALL" can be stored in the buffer screen memory 12. Accordingly, the line data "CALL A", "CALL B", "CALL C" and "CALL D" are stored in the buffer screen memory 12 and line data "CALL A", "CALL B" and "CALL C" are displayed on the screen of the display unit. The line data "CALL D" may be displayed by screen scrolling. If the range of display screen over which display is permitted coincides with the capacity of contents stored in the buffer screen memory, then all of the line data in the buffer screen memory can be displayed at one time through one display.

In the above example, the condition table 16 is described as containing a character string indicative of the kind of the condition, but it may contain data control information other than a character string. The data control information, as indicated by $I_1$ to $I_4$, heads the data in the data storage area 8 to represent the status of respective data. Included in the data control information are the length of data and information as to whether the data has been updated previously. If the condition table is set to the data control information $I_2$, then the video input/output section 5 will select only the line data "CALL B" identified by "$I_2$" in the condition table and the selected data will be stored in the buffer screen memory 12 and then displayed on the screen. The kind of condition is not limited to one, but a plurality of different conditions may be set in the table and data commensurate with the logical OR and logical AND of the plurality of conditions may be selected.

FIG. 4 is a flow chart of a procedure for displaying data commensurate with a specified condition. This processing flow forms part of the edit processing of step 205 in the FIG. 2 processing flow. In step 401, one of the unit data (a character string of one line on the display screen) is read out of the data storage area 8. In step 402, it is decided whether the kind of a condition in the condition table is of "character string" or "data control information". If the condition is for "character string", it is decided in step 403 whether the read unit data is commensurate with the condition of the character string set in the filter 13. In other words, it is decided whether the data contains the word "CALL". If the condition is for "data control information", it is decided in step 404 whether the contents of data control information in the condition table is commensurate with the read unit data. In step 405, the decision result obtained in step 403 or 404 is checked for coincidence or non-coincidence. If the unit data is commensurate with the condition, this unit data is then stored in the buffer screen memory 12, in step 406. At that time, position information indicative of a position taken by that unit data within the data storage area 8 is concurrently stored as pointer information in the buffer screen memory 12. When non-coincidence of the data with the condition is determined or the step 406 is completed, it is decided in step 407 whether processings for all of unit data in the data storage area 8 are completed. In the presence of unit data which has not been subjected to processing yet, the procedure returns to the step 401 and the same processing flow as above is repeated for this unit data. Upon completion of processings for all of the unit data in the data storage area 8, a set of data stored in the buffer screen memory 12 is delivered to the video data terminal 1 and displayed on the screen.

The specified data displayed in this manner is edited, for example, updated as will be described below. When new data and a command for instructing the updating are inputted from the video data terminal to the video input/output section 5, data in buffer screen memory 12 designated by the command is updated to the new data. Consequently, data stored in the data storage area 8 and corresponding to the updated data is also updated on the basis of pointer information of the updated data stored in the buffer screen memory 12. For example, when the operator watching the data "CALL A" displayed on the screen 11 desires to update "A" in that data to "AA", the data "AA" and an update command for designating the data to be updated are inputted to the video input/output section 5. As a result, "A" in the data "CALL A" stored in the buffer screen memory 12 is updated to "AA" and concurrently "A" in the corresponding data "CALL A" stored in the data storage area 8 is also updated to "AA" in accordance with a pointer 1.

In FIG. 4, two kinds of conditions are used and only data commensurate with any one of the conditions is selected. FIG. 5 illustrates a flow chart of a processing for selecting data which is commensurate with both of two kinds of conditions (logical AND of the two conditions). Excepting steps shown in FIG. 5, processing steps are identical to those of FIG. 4 and will not be described. In step 501, it is decided whether the kinds of conditions "character string" and "data control information" are both set. If both of the conditions are not set, the procedure proceeds to the step 402 of FIG. 4. If both of the conditions are set, it is decided in step 502 whether the data is commensurate with both of the conditions. A decision result is checked for coincidence or non-coincidence, in step 503. If the data is commensurate with both conditions, then the step 406 of FIG. 4 is executed. If the data is not commensurate with at least one of the conditions, then the procedure proceeds to the step 407 of FIG. 4.

From the foregoing description it should be apparent that various changes or modifications may be possible within the scope of the appended claims. For example, more than two conditions may be set or a combinational condition of the logical OR and logical AND may be set.

I claim:

1. An interactive text editing method in which the operator edits data displayed on a screen of a display unit while watching the screen, said method comprising the steps of:
    (a) storing a plurality of units of data in first storage means in an amount greater than the amount of data that can be displayed on the screen at one time, each unit of data being smaller than the amount of data than can be displayed on the screen at one time;
    (b) setting a specified data condition indicating specified data among the data stored in said first storage means in response to a command instructing display on the screen of only those units of data in the first storage means which include said specified data indicated by said specified data condition;
    (c) reading a unit of data out of said first storage means;
    (d) deciding whether said unit of data read from said first storage means is commensurate with said specified data condition;
    (e) storing said read unit of data in second storage means only when said read unit of data is commensurate with said specified data condition;
    (f) executing the steps (c) through (e) for all units of data stored in said first storage means; and
    (g) displaying a plurality of units of data stored in said second storage means at one time.

2. An interactive text editing method according to claim 1 wherein said specified data condition includes a plurality of different conditions, and said deciding step is for deciding whether a unit of data read out of said first storage means is commensurate with a condition of the logical OR of said plurality of different conditions.

3. An interactive text editing method according to claim 2 wherein said plurality of different conditions include information representative of the contents of said specified data and data control information on said specified data, and said deciding step is for deciding whether a unit of data read out of said first storage means is commensurate with a condition of any one of said information representative of the contents and said data control information.

4. An interactive text editing method according to claim 1 wherein said specified data condition includes a plurality of different conditions and said deciding step is for deciding whether a unit of data read out of said first storage means is commensurate with a condition of the logical AND of said plurality of different conditions.

5. An interactive text editing method according to claim 1 wherein said plurality of different conditions include information representative of the contents of said specified data and arrangement information on said specified data, and said deciding step is for deciding whether a unit of data read out of said first storage means is commensurate with a condition of both of said information representative of the contents and data control information.

6. An interactive text editing method according to claim 1 wherein said specified data condition includes a plurality of different conditions and said deciding step is for deciding whether a unit of data read out of said first storage means is commensurate with a combinational condition of the logical OR and logical AND of said plurality of different conditions.

7. An interactive text editing method according to claim 1 wherein the specified data condition includes a character string and data control information.

8. An interactive text editing method according to claim 1 wherein said step of storing said unit of data in said second storage means is for storing in said second storage means said unit of data along with address information indicative of an address taken by said unit of data within said first storage means and wherein said text editing method further comprises steps of updating designated data in said second storage means in response to a command for instructing updating of said designated data and update data stored in said first storage means and corresponding to said update data in said second storage means on the basis of said address information.

9. An interactive text editing method according to claim 8 wherein said specified data condition includes a plurality of different conditions, and said deciding step is for deciding whether a unit of data read out of said first storage means is commensurate with a condition of the logical OR of said plurality of different conditions.

10. An interactive text editing method according to claim 9 wherein said plurality of different conditions include information representative of the contents of said specified data and data control information on said specified data, and said deciding step is for deciding whether a unit of data read out of said first storage means is commensurate with a condition of any one of said information representative of the contents and said data control information.

11. An interactive text editing method according to claim 8 wherein said specified data condition includes a plurality of different conditions and said deciding step is for deciding whether a unit of data read out of said first storage means is commensurate with a condition of the logical AND of said plurality of different conditions.

12. An interactive text editing method according to claim 11 wherein said plurality of different conditions include information representative of the contents of said specified data and arrangement information on said specified data, and said deciding step is for deciding whether a unit of data read out of said first storage means is commensurate with a condition of both of said information representative of the contents and data control information.

13. An interactive text editing method according to claim 8 wherein said specified data condition includes a plurality of different conditions and said deciding step is for deciding whether a unit of data read out of said first storage means is commensurate with a combinational condition of the logical OR and logical AND of said plurality of different conditions.

14. An interactive text editing system including a display unit having a screen, in which the operator edits data displayed on the screen of the display unit while watching the screen, said system comprising:
   first storage means for storing a plurality of units of data in an amount greater than the amount of data that can be displayed on the screen at one time, each unit of data being smaller than the amount of data that can be displayed on the screen at one time;
   means for setting a specified data condition indicating specified data among the data stored in said first storage means in response to a command instructing display on the screen of only those units of data stored in the first storage means which include said specified data indicated by said specified data condition;
   means for reading all the units of data out of said first storage means;
   means for determining whether each unit of data read from said first storage means is commensurate with said specified data condition;
   second storage means for storing only the read units of data from said reading means which are commensurate with the specified data condition and for storing address information indicative of addresses within said first storage means which correspond to said read units of data which are commensurate with the specified data condition;
   display means for selectively displaying at one time a plurality of the units of data stored in said second storage means; and
   means, in response to a command indicative of updating of the data displayed on said display means, for updating data stored in said second storage means designated by said update command, and, simultaneously, updating data stored in said first storage means indicated by the address information in the second storage means which corresponds to the updated data in the second storage means.

* * * * *